(12) United States Patent
Groeneweg (10) Patent No.: US 7,901,117 B2
(45) Date of Patent: *Mar. 8, 2011

(54) SAFETY AND CONSTRUCTION TRAILER

(75) Inventor: Kevin K. Groeneweg, Golden, CO (US)

(73) Assignee: Concaten Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/533,931

(22) Filed: Jul. 31, 2009

(65) Prior Publication Data

US 2009/0290324 A1   Nov. 26, 2009

Related U.S. Application Data

(63) Continuation of application No. 11/209,460, filed on Aug. 23, 2005, now Pat. No. 7,572,022.

(51) Int. Cl.
*B60Q 1/124*   (2006.01)

(52) U.S. Cl. ............... 362/458; 404/6; 404/9; 280/408; 280/656; 280/404; 280/441.2

(58) Field of Classification Search .............. 362/26, 362/458; 404/6, 9; 280/408, 656, 404, 441.2
See application file for complete search history.

(56) References Cited

U.S. PATENT DOCUMENTS

| | | |
|---|---|---|
| 431,657 A | 7/1890 | Hale |
| 3,120,398 A | 2/1964 | Butterworth |
| 3,326,099 A | 6/1967 | Cova et al. |
| 3,734,540 A | 5/1973 | Thiermann |
| 3,774,940 A | 11/1973 | Merritts |
| 3,952,453 A | 4/1976 | Amburgey |
| 3,990,532 A | 11/1976 | Robinson |
| 4,017,200 A | 4/1977 | Woods, Jr. |
| 4,060,255 A | 11/1977 | Zimmermann |
| 4,087,785 A | 5/1978 | Dodich |
| 4,240,647 A | 12/1980 | Lewis |
| 4,385,771 A * | 5/1983 | Eckels ..................... 280/400 |
| 4,406,563 A | 9/1983 | Urlberger |
| 4,600,178 A | 7/1986 | Zucker et al. |
| 4,601,509 A | 7/1986 | Ellis, Sr. |
| 4,624,601 A | 11/1986 | Quittner |
| 4,681,302 A | 7/1987 | Thompson |

(Continued)

FOREIGN PATENT DOCUMENTS

DE   806760   6/1951

(Continued)

OTHER PUBLICATIONS

U.S. Appl. No. 12/347,467, filed Dec. 31, 2008, Groeneweg.

(Continued)

*Primary Examiner* — Sandra L O Shea
*Assistant Examiner* — Jessica L McMillan
(74) *Attorney, Agent, or Firm* — Sheridan Ross P.C.

(57) ABSTRACT

A safety trailer has semi-tractor hitches at both ends and a safety wall that is fixed to one side of the trailer. That side, however, can be changed to the right or left side of the road, depending on the end to which the truck attaches. A caboose can be attached at the end of the trailer opposite the tractor to provide additional lighting and impact protection. Optionally, the trailer can be equipped with overhead protection, lighting, ventilation, onboard hydraulics, compressors, generators and other equipment, as well as related fuel, water, storage and restroom facilities and other amenities.

35 Claims, 6 Drawing Sheets

U.S. PATENT DOCUMENTS

| | | |
|---|---|---|
| 4,729,486 A | 3/1988 | Petzold et al. |
| 4,773,629 A | 9/1988 | Yoduck |
| 4,869,617 A | 9/1989 | Chiodo |
| 4,946,306 A | 8/1990 | Yoduck |
| 5,007,763 A | 4/1991 | Burgett |
| 5,011,325 A | 4/1991 | Antonioli |
| 5,033,905 A | 7/1991 | Schmidt et al. |
| 5,057,820 A | 10/1991 | Markson et al. |
| 5,088,874 A | 2/1992 | Quittner |
| 5,101,927 A | 4/1992 | Murtuza |
| 5,104,254 A | 4/1992 | Durand |
| 5,104,255 A | 4/1992 | Bodensohn |
| 5,123,773 A | 6/1992 | Yoduck |
| 5,208,585 A | 5/1993 | Sprague |
| 5,286,136 A | 2/1994 | Mandish et al. |
| 5,292,467 A | 3/1994 | Mandish et al. |
| 5,336,016 A | 8/1994 | Baatz |
| 5,387,049 A | 2/1995 | Duckett |
| 5,425,594 A | 6/1995 | Krage et al. |
| 5,480,255 A | 1/1996 | Bernaquez et al. |
| 5,498,101 A | 3/1996 | Braverman |
| 5,531,540 A | 7/1996 | Wasserstrom et al. |
| 5,611,641 A | 3/1997 | Christensen |
| 5,688,071 A | 11/1997 | Owen |
| 5,836,714 A | 11/1998 | Christensen |
| 5,947,452 A | 9/1999 | Albritton |
| 5,988,934 A | 11/1999 | Wasserstrom |
| 6,098,767 A | 8/2000 | Unrath |
| 6,213,047 B1 | 4/2001 | Means et al. |
| 6,220,780 B1 | 4/2001 | Schindler et al. |
| 6,231,065 B1 | 5/2001 | Brown |
| 6,349,517 B1 | 2/2002 | Manley et al. |
| 6,371,505 B1 | 4/2002 | Turner, II |
| 6,409,417 B1 | 6/2002 | Muller et al. |
| 6,450,522 B1 | 9/2002 | Yamada et al. |
| 6,523,872 B2 | 2/2003 | Breed |
| 6,581,992 B1 | 6/2003 | Gertz |
| 6,669,402 B1 | 12/2003 | Davis et al. |
| 6,863,468 B2 | 3/2005 | Davis et al. |
| 6,926,461 B1 | 8/2005 | Faller et al. |
| 6,942,263 B2 | 9/2005 | Welch et al. |
| 7,125,198 B2 * | 10/2006 | Schiefferly et al. ............ 404/6 |
| 7,354,218 B1 * | 4/2008 | Dyke et al. ............ 404/6 |
| 7,410,321 B1 | 8/2008 | Schiefferly et al. |
| 7,572,022 B2 | 8/2009 | Groeneweg |
| 2007/0012534 A1 | 1/2007 | Murphy |
| 2009/0166998 A1 | 7/2009 | Groeneweg |

FOREIGN PATENT DOCUMENTS

| | | |
|---|---|---|
| GB | 860338 | 2/1961 |
| WO | WO 93/12300 | 6/1993 |

OTHER PUBLICATIONS

Texas Transportation Institute, "Development of Functional Requirements for a Highly-Mobile Barrier System to Protect Highway Workers: Interim Report—Draft", May 2004, pp. 1-45.

Beason, et al., "Development of a Truck-Mounted Portable Maintenance Barrier", Research Report No. 262-5, Research Study No. 2-18-79-262, Safety Devices for Highway Work Zones, Texas Transportation Institute, Apr. 1984, pp. 1-82.

Official Action for U.S. Appl. No. 11/209,460, mailed Mar. 14, 2008.
Official Action for U.S. Appl. No. 11/209,460, mailed May 15, 2008.
Official Action for U.S. Appl. No. 11/209,460, mailed Sep. 22, 2008.
Official Action for U.S. Appl. No. 11/209,460, mailed Dec. 18, 2008.
Notice of Allowance for U.S. Appl. No. 11/209,460, mailed Jun. 26, 2009.
Background of the above-referenced Application (previously provided).
U.S. Appl. No. 12/713,822, filed Feb. 26, 2010, Groeneweg.

* cited by examiner

Fig. 6

SAFETY AND CONSTRUCTION TRAILER

RELATED APPLICATION

The present application is a continuation of U.S. patent application Ser. No. 11/209,460, filed Aug. 23, 2005, entitled "SAFETY AND CONSTRUCTION TRAILER", now U.S. Pat. No. 7,572,022, which is based on, and claims priority to the Applicant's U.S. Provisional Patent Application Ser. No. 60/604,257, entitled "Safety and Construction Trailer," filed on Aug. 25, 2004, each of which are incorporated herein by this reference in their entirety.

BACKGROUND OF THE INVENTION

1. Field of the Invention

The present invention relates generally to the field of trailers and other types of barriers used to shield road construction workers from traffic. More specifically, the present invention discloses a safety and construction trailer having a fixed safety wall and semi tractor hookups at both ends.

2. Statement of the Problem

Various types of barriers have long been used to protect road construction workers from passing vehicles. For example, cones, barrels and flashing lights have been widely used to warn drivers of construction zones, but provide only limited protection to road construction workers in the event a driver fails to take heed. Some construction projects routinely park a truck or other heavy construction equipment in the lane between the construction zone and on-coming traffic. This reduces the risk of worker injury from traffic in that lane, but does little with regard to errant traffic drifting laterally across lanes into the construction zone. In addition, conventional barriers require significant time and effort to transport to the work site, and expose workers to significant risk of accident while deploying the barrier at the work site. Therefore, a need exists for a safety barrier that can be readily transported to, and deployed at the work site. In addition, the safety barrier should protect against lateral incursions by traffic from adjacent lanes, as well as traffic in the same lane.

SOLUTION TO THE PROBLEM

In contrast to the prior art in the field, the present invention provides a safety trailer with a fixed safety wall and semi tractor hookups at both ends. The safety wall (and thus the entire trailer) can be of a given length or it can be extendable, but the wall is "fixed" to the platforms on one side of the trailer. That side, however, can be changed to the right or left side of the road, depending on the end to which the semi tractor attaches. This dual-ended, fixed-wall design thus eliminates the need for complex shifting or rotating designs, which are inherently weaker and more expensive, and which cannot support the visual barriers, lighting, ventilation and other amenities necessary for providing a comprehensive safety solution. The directional lighting and impact-absorbing features incorporated at each end of the trailer and in the caboose combine with the fixed wall and improved lighting to provide increased protection for both work crews and the public, especially with ever-increasing amounts of nighttime construction. End platforms integral to the trailer's design minimize the need for workers to leave the protected zone and eliminate the need for separate maintenance vehicles by providing onboard hydraulics, compressors, generators and related power, fuel, water, storage and portable restroom facilities. Optional overhead protection can be extended out over the work area for even greater environmental relief (rain or shine). The fixed wall itself can be made of any rigid material. The trailer carries independent directional and safety lighting at both ends and will work with any standard semi tractor. Optionally, an impact-absorbing caboose can be attached at the end of the trailer opposite the tractor to provide additional safety lighting and impact protection.

The present trailer is designed to provide road maintenance personnel with improved protection from ongoing, oncoming and passing traffic, to reduce the ability of passing traffic to see inside the work area (to mitigate rubber-necking and secondary incidents), and to provide a fully-contained, mobile, enhanced environment within which the work crews can function day or night, complete with optional power, lighting, ventilation, heating, cooling, and overhead protection including extendable mesh shading for sun protection, or tarp covering for protection from rain, snow or other inclement weather.

Platforms can be provided at both ends of the trailer for hydraulics, compressors, generators and other equipment and supplies, including portable restroom facilities. The trailer can be fully rigged with direction and safety lighting, as well as lighting for the work area and platforms. Power outlets are provided in the interior of the work area for use with construction tools and equipment, with minimal need for separate power trailers or extended cords. Both the caboose and the center underside of both end platforms provide areas for fuel, water and storage. Additional fuel, water and miscellaneous storage space can be provided in an optional extended caboose of like but lengthened design.

The trailer is designed to eliminate the need for separate lighting trucks or trailers, to reduce glare to traffic, to eliminate the need for separate vehicles pulling portable restroom facilities, to provide better a brighter, more controlled work environment and enhanced safety, and to, among other things, better facilitate 24-hour construction along our nation's roadways. Other applications include but are not limited to public safety, portable shielding and shelter, communications and public works. Two or more trailers can be used together to provide a fully enclosed inner area, such as may be necessary in multi-lane freeway environments, as shown for example in FIG. 4.

With significant shifts to night construction and maintenance, the present trailer provides a well-lit, self-contained, mobile safety enclosure. Historical cones can still be used to block lanes, and detection systems or personnel can be used to provide notice of an errant driver, but neither offers physical protection or more than split second warning for drivers who may be under the influence of alcohol or intoxicants, or who, for whatever reason, become fixated on the construction/maintenance equipment or lights and veer into or careen along the same.

Studies have indicated that people are drawn to lights and distractions, and that they tend to steer and drive into what they are looking at. This is particularly hazardous for construction workers, especially where cones and other temporary barriers are being deployed on maintenance projects. Studies also indicate that lighting and equipment movement within a work zone are important factors in work site safety. Significant numbers of people are injured not only from errant vehicles entering the work zone, but also simply by movement of equipment within the work area. The trailer is designed not only to keep passing traffic out of the work area, but also to reduce the amount of vehicles and equipment otherwise moving around within the work area. In terms of lighting, research indicates more is better. Current lighting is often somewhat removed from the location where the work is actually taking place. Often, the lighting banks are on separate carts which themselves contribute to equipment traffic, congestion and accidents within the job site. The trailer is designed to provide substantial lighting where it is needed. If the work moves, the lighting moves with the work area, rather than the work area moving away from the lighting. Most importantly, the safety barrier—front, back and side—will move along too, providing simple but effective physical and visual barriers to passing traffic.

The trailer is intended to provide an increased level of physical protection both day and night, and to provide workers with a self-contained and enhanced work environment that provides them with basic amenities such as restrooms, water, power, lighting, ventilation and even some possible heating/cooling and shelter. The trailer is also designed to keep passing motorists from seeing what is going on within the work area and hopefully facilitate better attention to what is going on in front of them. Hopefully, this will reduce both direct and secondary incidents along such construction and maintenance sites.

SUMMARY OF THE INVENTION

This invention provides a safety trailer with semi-tractor hookups at both ends and a safety wall that is fixed to one side of the trailer. That side, however, can be changed to the right or left side of the road, depending on the end to which the semi-tractor attaches. A caboose can be attached at the end of the trailer opposite the tractor to provide additional lighting and impact protection. Optionally, the trailer can be equipped with overhead protection, lighting, ventilation, onboard hydraulics, compressors, generators and other equipment, as well as related fuel, water, storage and restroom facilities and other amenities.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
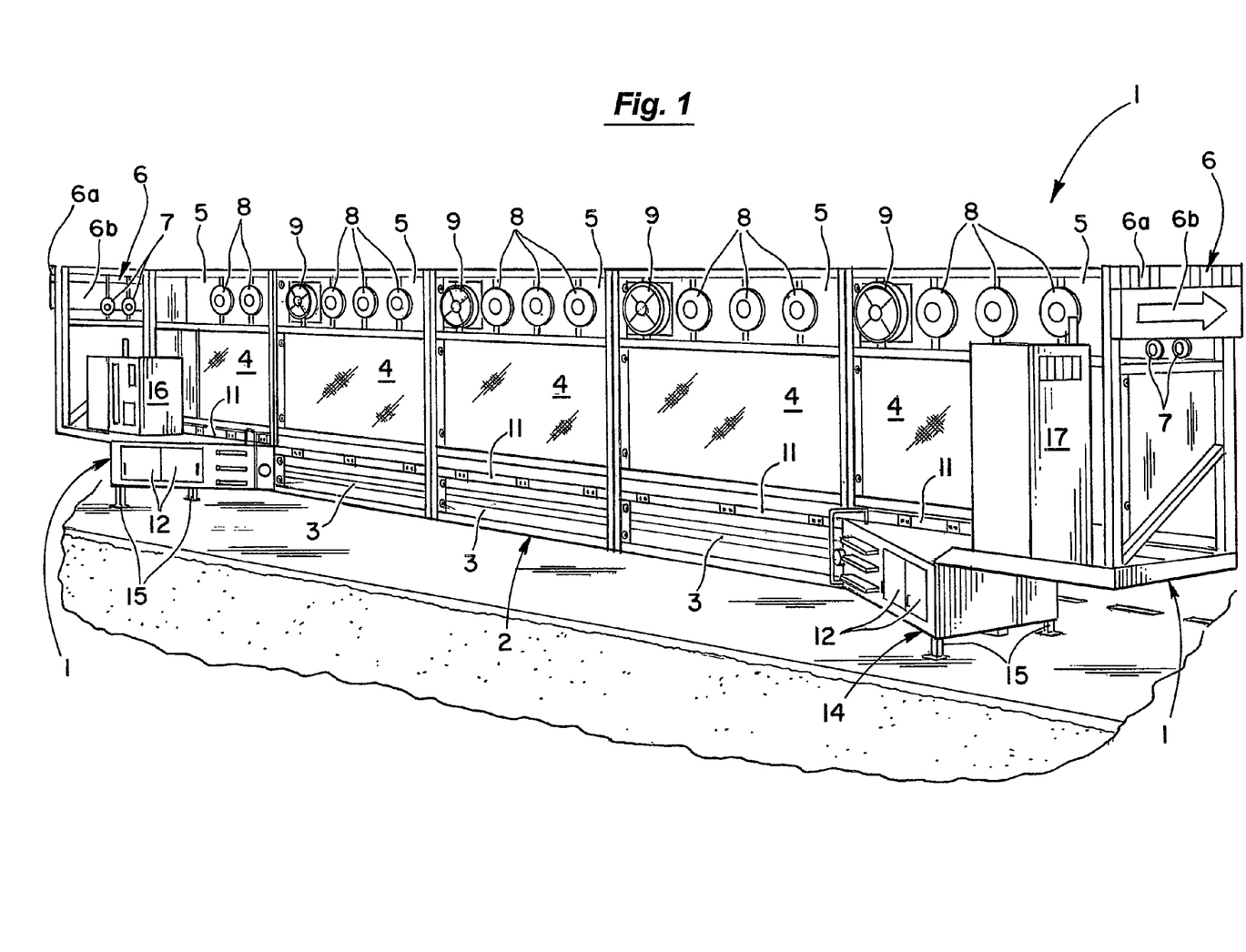
FIG. 1 is a side perspective view of the safety trailer showing optional mid and upper wall sections and associated lighting and ventilation.
Figure 4:
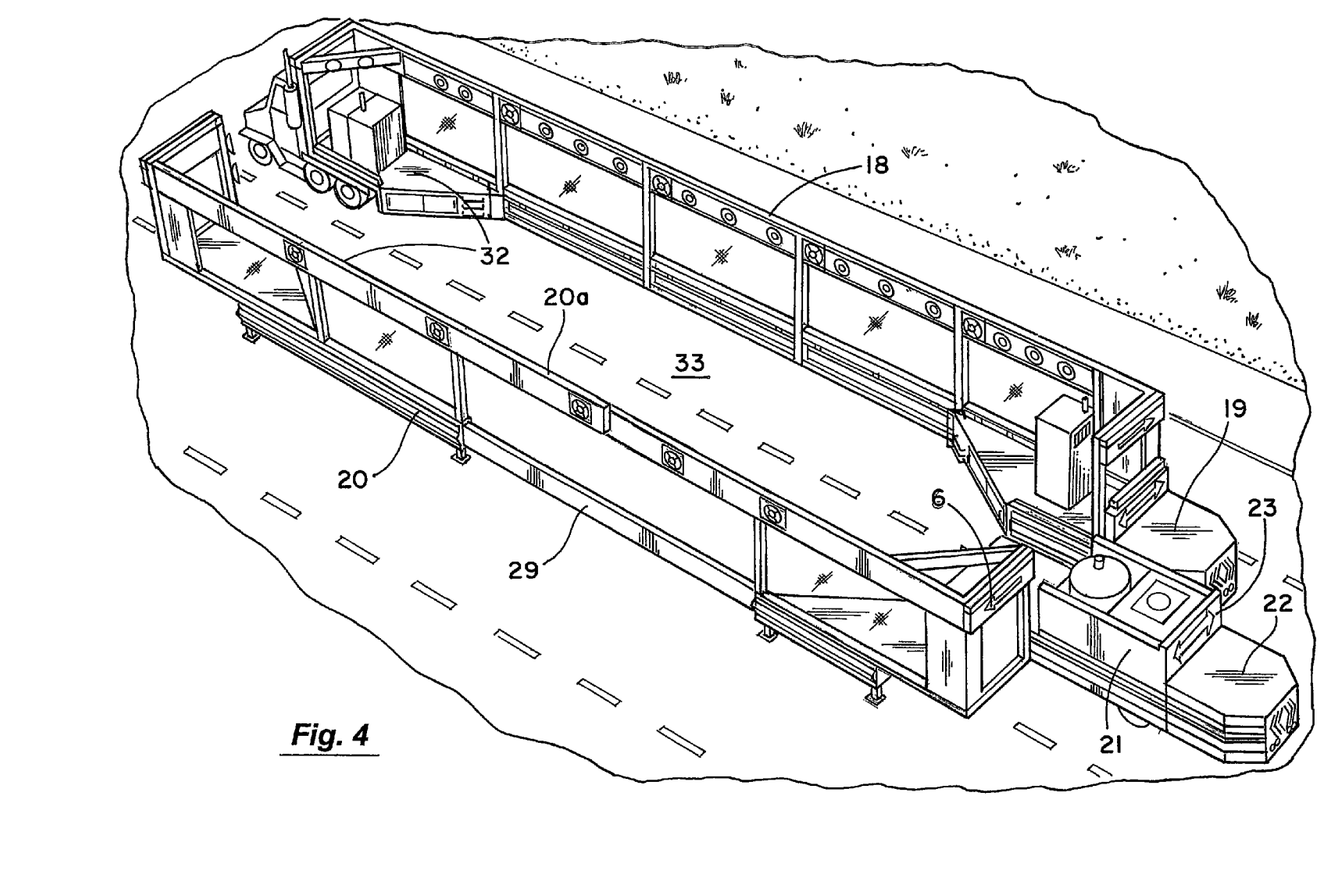
FIG. 4 is a perspective view showing two trailers 18, 20 parked side-by-side to create a protected area 33 between the trailers.
Figure 5:
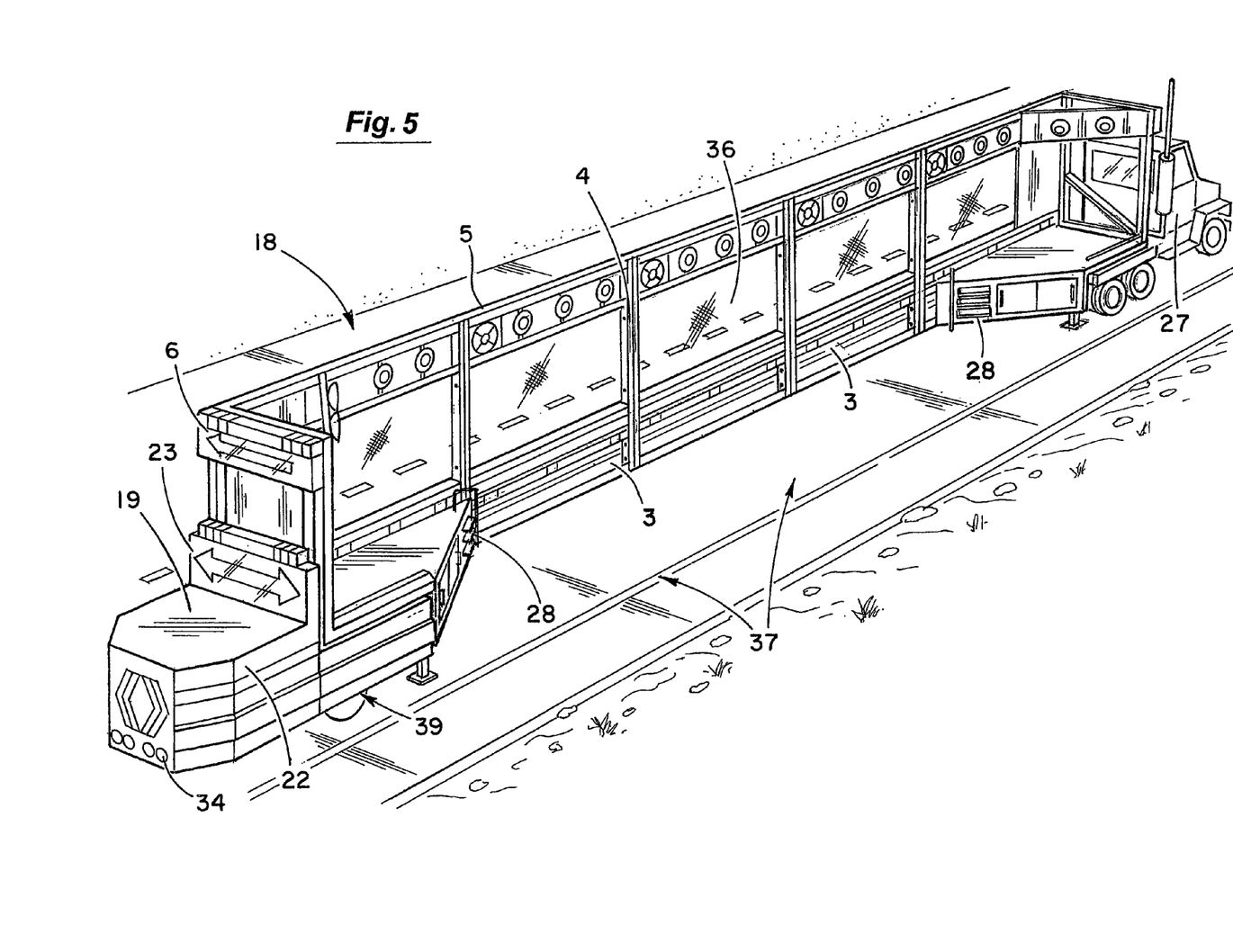
FIG. 5 is perspective view showing a safety trailer with a caboose and semi tractor attached. The trailer is open toward the viewer showing the internal space and work area.
Figure 6:
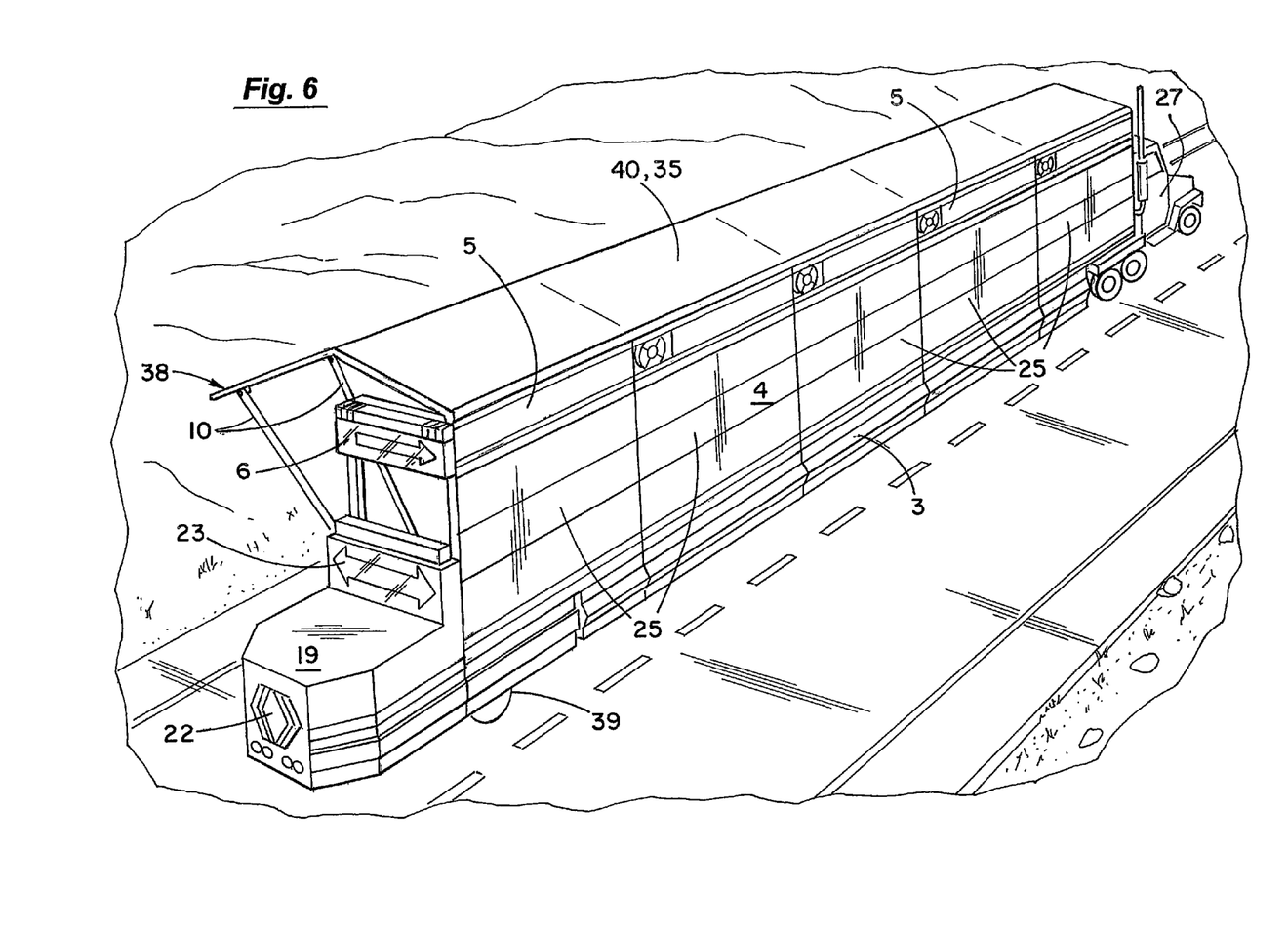
FIG. 6 is a perspective view showing a safety trailer with the canopy 40, 35 extended and the caboose and semi tractor attached. The trailer is open away from the view to show the exterior wall.

Turning to FIG. 1, the trailer in the present invention is equipped with standard semi-tractor hookups or hitches 1 at both ends. A tractor 27 can be hooked to one end, and an impact-absorbing caboose 19 or 21 can be hooked at the other, as illustrated in FIGS. 4, 5 and 6. By enabling the tractor 27 to hook at either end, the trailer can incorporate a rigid fixed wall 2 that is open to the right or left side of the road depending on the end on which the tractor is connected, as illustrated in FIGS. 4, 5 and 6. Thus, the side wall 2 and the ends of the trailer define a protected work area for road maintenance operations. Note that the tractor and caboose exchange trailer ends in FIGS. 5 and 6, thus changing the side to which the wall 2 faces. In turn, the dual-hookup, fixed-wall design enables and incorporates platforms for equipment and storage 12, and onboard power 11 and 16, lighting 6-8, ventilation, heating and cooling 9, relatively high shielding from driver views 3 and 4, optional overhead protection 10, 35, 38 and 40, and in general, a larger and better work environment 37, day or night.

Safety Lighting. Large safety directional lights 6, 6a and 6b can be incorporated at each end of the trailer, along with light bars for emergency situations. This lighting is in addition to the lighting 23 and 34 on the caboose 19 or 21, as shown in FIG. 5. All lighting can be driven from the onboard power systems 16.

Onboard Power, Restrooms, and Equipment. Platforms at both ends of the trailer provide area for hydraulics, compressors, generators 16, restroom facilities 17, and other equipment. Power can be provided via both PTO power from the tractor trailer as well as generator power 16 from one of the end platforms. A power strip 11 along the inside length of the trailer provides convenient connections for tools and equipment, without the need for lengthy cords and separate generators. The portable restrooms 17 can be loaded and removed as necessary. The platforms also provide surface area for additional storage of equipment and supplies.

Fuel, Water, Storage and Counterbalances Under Platforms. Space is provided for storage and/or for fuel and water tanks 12 in the protected belly of the trailer under the platforms. An optional elongated caboose 21 can provide even more fuel, water and storage space. The outer areas of each platform can contain counterbalancing weights 14. For example, lead or other high-density materials can be used. Optional additional counterbalancing for the platform can be provided if necessary.

Trailer Stand. Standard trailer stands 15 are used at each end of the trailer. While the tractor and caboose are switching ends, the trailer will set on the stands (see e.g., FIGS. 1, 3 and 4). The stands 15 can also be lowered to further stabilize the trailer when not in motion.

Work Area Lighting. An array of work area lights 8 are provided and carried in the upper portion of the outer wall 2, as discussed below. The lighting 8 provides a well-illuminated area for the work crews. For traffic, the work area lighting 8 is largely obscured and hidden from view. This eliminates the need for glaring generator lighting carts that have to otherwise be pulled in place or pulled along at the job sites and/or too frequently are some distance from the actual work area. Additional platform lighting 7 can also provided for the platform areas of the trailer.

Fans, Heating & Cooling. Fans 9 can also be mounted to the wall 2 to provide supplemental ventilation. As noted below with respect to the top portion 5 of the outer wall 2, the fans 9 can be enclosed with protecting screening rather than exposed as shown here. Optional heating and cooling units (air-conditioning or misters) can be added to the fans 9 to provide a bit cooler air when it is hot and a bit warmer air when it is cold. Both heating and cooling units can be carried at one or both ends of the trailer and powered from the onboard sources 16.

Caboose. The standard caboose 19 shown in FIG. 2 serves as the rear wheels of the trailer and includes an impact-absorbing nose or crash attenuator 22 in case of an incident. The caboose 19 can also include directional safety lighting 23 and road lighting 34. The preferred embodiment of the caboose would include a steel frame and shell, with standard semi-trailer axle or axles, wheels 39 and hookups for brakes, lighting and crash attenuation unit.

Figure 2:
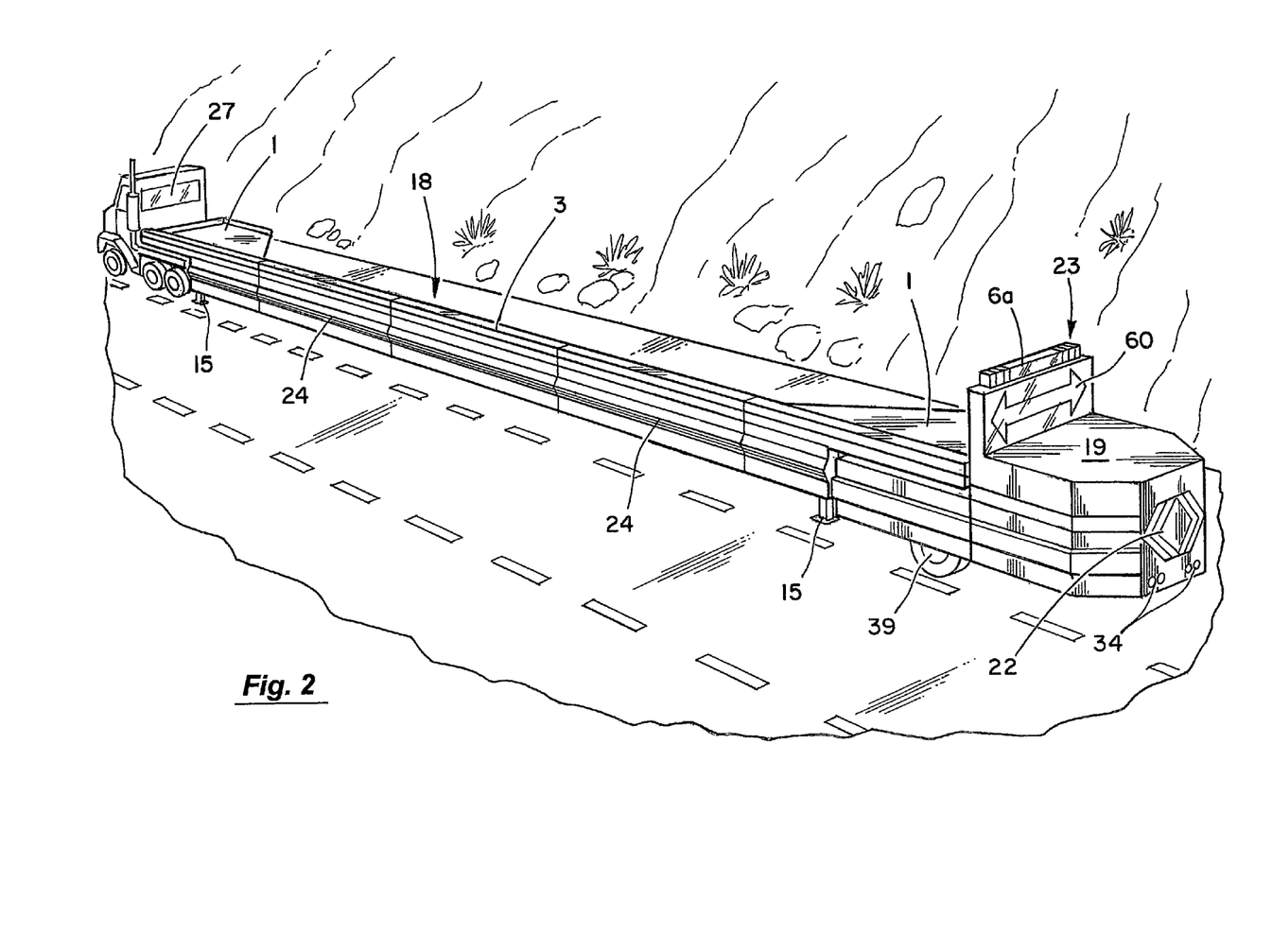
FIG. 2 is a side perspective view of two embodiments of the safety trailer showing the fixed outer wall as exposed to traffic, without the mid and upper wall sections. This is referred to as the base trailer with the lower wall only.

The caboose can be either steered independently or fixed in place to function like the rear wheels of a standard semi-trailer (e.g., FIG. 2). The preferred embodiment would be to use the short caboose 19 in a fixed configuration as shown in FIGS. 2, 4, 5 and 6. Any type of locking mechanism can be used to fix the caboose 19. The preferred embodiment would be to have caboose 19 carry a standard trailer plate like that on tractors to connect to the trailer, and to carry an additional interlocking tongue and groove or pin and groove connection for which the counterpart would be incorporated at both ends of the trailer. When additional fuel, water and storage are required on an onboard basis, the optional extended caboose 21 can be used. As depicted in FIG. 5, optional guardrails 24 are available with brackets to allow for the quick and efficient repair of minor incidents. Use of the guardrails or safety paint scheme would be matched to that on the trailer.

The nose section 22 of each caboose 19 can incorporate any of a variety of crash attenuators or impact barriers, which in turn can be attached to the caboose directly behind the axle and directly below the safety lighting. A bracket or plate attached to the frame of the caboose would provide the connection for the crash attenuation unit.

The caboose 19 can carry standard traffic arrow directional lighting 23 powered from the trailer's onboard power systems 16. The arrow would be switched right or left, as appropriate, depending on what end of the trailer the caboose is hooked to and the side on which the outer wall and traffic is located. The lighting array can also include a flashing light bar 6a, as shown in FIG. 1, for use in case of emergencies, or other types of warning lights for oncoming traffic.

The caboose 19 has a connection at the front of the axle housing to run a hitch out under the nose for use with a standard ball hitch. With the hitch, a pickup or the semi-tractor can easily pull the caboose 19 to the other end of the trailer or otherwise move it as necessary.

Outer Wall. The trailer has a rigid outer wall 2 and semi-tractor attachments 1 on both ends. Depending on the end to which the semi-tractor attaches, the work area thus opens to the right or left side of the road as shown in FIGS. 4, 5 and 6. The trailer utilizes a fixed wall design in terms of the connections to the trailer hitches at both ends, but can be either fixed or extendable in length, and can open to the right or left, depending on which end the semi-tractor attaches itself. No articulating mechanism is needed or used to swing the barrier from right to left side of the trailer. The fixed nature of the wall 2 facilitates both simple and rigid operation, as well as night construction and environmental enhancements discussed below.

For example, the outer wall 2 can be comprised of three levels:
  Lower portion 3—a heavily constructed lower portion to provide a barrier to traffic and debris,
  Mid portion 4—an optional mid-portion of less weight and strength but also designed to provide a visual barrier, and
  Upper portion 5—an optional upper portion of relatively light construction fitted and rigged for self-contained mobile lighting 8 for night construction, as well as enclosed ventilation for fans 9 and optional heating and cooling.

Lower Portion of the Outer Wall. The lower portion of the wall 3 is intended to come up approximately as high or higher than the hood of a car, pickup or SUV. Currently, the preferred embodiment is approximately 4 feet. This portion of the wall can be constructed of any solid material. Current preferred embodiments include heavy steel panels (or "sections"), panels fabricated from concrete or other rigid materials, reinforced steel or fabricated panels, and panels filled with sand filler or other materials. For example, the exterior wall can be made of 20 foot long 0.375 inch steel panels specially folded or reinforced and bolted to the platform or to each other to form an elongated fixed wall. Three such wall panels can be attached to form a 60 foot wall between the platforms. The trailer thus described can be made longer or shorter by increasing or decreasing the number of panels used in the wall. The wall panels can be detached and placed on top of the platforms for long distance or higher speed transport. The platforms can be bolted and attached directly to each other when all panels are removed. The interior of the wall (i.e., the side toward the workers) can be open to allow internal access for inspection and repairs in the case of an incident. Either platform, or any applicable section of the wall could be removed and replaced in the event of an incident.

Another example would be to use the same panels to form walls with 6-12 inches of interior space into which sand in loaded. Bracing would be welded to the exterior wall, to which the interior wall would be bolted. The bracing would provide support and a consistent depth of the walls between which sand would be filled. As above, sections of the wall could be removed and replaced in the event of an incident.

Another example would be the use of one or more panels or sections fabricated from concrete or other rigid materials. Connections to the adjoining sections, as well as the upper portions of the wall and both ends of the trailer would be integrated into the fabricated wall. Any secure, rigid connection can be used. The preferred embodiment for connecting the sections (if more than one is used) would be metal brackets in something of an H shape, where the two arms of the open ends fit some length along the exterior of each section and affix firmly with multiple cross-bolts. Again, sections of the wall could be removed and replaced in the event of an incident.

Another example would be the use of a solid reinforced steel surface running the length of the trailer. The preferred embodiment of such a design would involve a heavy steel outer skin welded or bolted together and reinforced with bracing on the back (or inner) side. Assembly could also be by overlapping joints and/or such other means as would create a solid wall running the length of the trailer.

A power strip 11 runs along the exposed surface of the interior wall to provide outlets for equipment and tools. The power strip 11 is removable should a section of the wall need to be removed for inspection or repairs, or should a section of the wall need to be replaced.

The exterior of the wall can be fitted and supplied with brackets for guard rails 24, such as additional overlaying lengths of heavy steel or conventional guard rails such as those used along roadways. Such guard rails 24 may protect the main wall from minor incidents, such as when a vehicle angles into and scrapes along the side of the trailer, and may be quicker and easier to replace. The steel or fabricated panels may also contain special folds providing raised surfaces and added strength and rigidity, which also can server as an integral type of guard rail.

The exterior wall, as thus described embodies what is sometimes referred to as a "fixed wall" design. It is a fixed wall in that it is always on only one side of the trailer, although the work area can open to the right or left side of the road depending on the end to which the tractor and caboose are attached, as in FIGS. 4, 5 and 6. The length of the wall and thus the overall trailer can be longer or shorter depending on the number of panels or sections installed, or the length to which the wall is otherwise made.

The fixed wall design allows for significant economies in manufacture, maintenance and repair. For example, sections or panels of steel wall can be formed at the steel mills by large presses and preformed and sized to specifications. In the case of an incident where a vehicle strikes the wall or one of the platforms, the same can be inspected and the platform and/or one or more sections of the wall can replaced relatively quickly and economically if necessary.

The fixed wall design also provides a base upon which optional visual barriers (e.g., the mid wall 4) and lighting and ventilation (the upper wall 5) can be added. The preferred embodiment of the mid and upper walls would again follow the modular or sectional design of the lower wall, and affix both to the lower wall and horizontally to each other via a series of bolts, pins and/or other connections. Connections are provided for power, lighting and other amenities. The wall can be designed to extend vertically to any desired height to provide a visual barrier between passing motorists and the work area.

Figure 3:
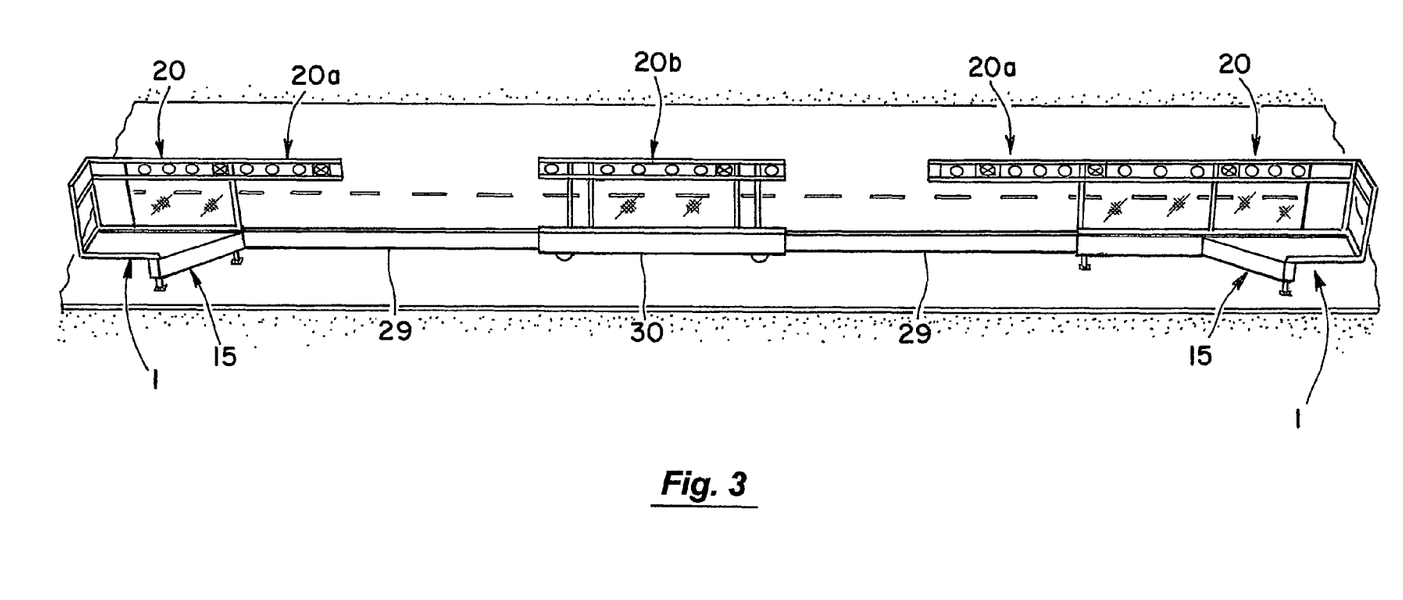
FIG. 3 is a side perspective view of an extendable version of the safety trailer in its hyper-extended configuration with an additional extension 30.

In addition to the fixed length version of the trailer 18, an extendable version 20 with multiple sections can also be provided. The extendable trailer 20 would allow for a shorter overall length while driving between destinations, and would provide some benefits in terms of mobility. One embodiment for the extendable version of the trailer 20 would involve an extendable crane type extendable steel housing and inner core 29 as represented in FIGS. 3 and 4. The trailer can be extended and contracted hydraulically or by simply having the semi-tractor pull slowly forward or back slowly up. A latch would lock in place when the trailer reaches full length. A simple, but heavy hook-type latch could be used where the point goes into a groove to lock the trailer length before the sections fully separate. One or more safety cross-bolts further lock the trailer length.

The extendable version of the trailer could be further lengthened by adding additional wall extensions 30 as shown in FIG. 3. The preferred embodiment for doing so would be to hold open the locking mechanism that typically catches when the trailer is being separated. To the extent the locking mechanism is manually held open, the latch will not catch and the two ends of an extendable trailer can be separated. Each separating end would need to be supported in some way, such as with a steel roller brace positioned under each separating end before they are fully pulled apart. The sections would then be pulled apart far enough to allow an additional extension 30 to be rolled into place and attached to both ends. The additional extension 30 may itself also have an extendable inner core similar to that used on the trailer 29, which when connected at both ends, can be further pulled apart until the latch locks and the cross-bolts are inserted. Wheels on the extension would be themselves locked once in place.

The extending inner core of the extendable trailer 29, as well as any extendable core of an additional extension, would be heavily constructed of any solid material. The preferred embodiment of the inner core would be steel casing filled with concrete or sand for further weight and structural rigidity. The extendable version of the trailer can also incorporate offset upper portions of the outer wall 20a to allow the mid and top levels of the respective sections to parallel each other when compressed and still provide the maximum length of lighting that can be carried with the compacted trailer 20. Similar lighting and ventilation 20b can be mounted at intervals along the top of any additional extensions that may be inserted.

The clearance to the bottom of the wall, the height of the bottom portion of the wall, and the length of the wall can be made to customer specifications. The preferred embodiment would include a clearance of 12 inches, a height of 4 feet, and a length of 75-100 feet for Department of Transportation road construction purposes, subject to the issuance of applicable permits and applicable road and condition characteristics.

Mid-Portion of Outer Wall. The optional mid-portion of the outer wall 4 consists of mesh or cable-reinforced meshing 36 or solid side panels 25. The mesh 36 would be relatively opaque to passing traffic at an angle and be used to deter traffic from looking into the work area and being distracted (FIG. 5). The preferred current embodiments involve mesh fabric 36 similar to that used on top of industrial vehicles (e.g., semi-dump trucks), with or without a cable-backing similar to that used at race tracks. Other and stronger mesh materials can be used. The cabling is provided where additional protection is desired to protect workers from the risk of work area intrusions from airborne vehicles or debris in the case of an incident. The mesh and cables retract to one end of the trailer or to one end of each section of the wall, with one possible embodiment being simply manually-operated winch-type rollers. While opaque to oncoming traffic, the mesh and cabling dissipate side wind resistance and allow for additional side breezes in hot weather.

The mesh and cable can be retracted and replaced with side panels 25 during inclement weather or as desired. The side panels 25 can be made of any solid material. The preferred current embodiment is to use multiple relatively thin and light aluminum or steel panels that can be attached and affixed with the assistance of a pay-loader or similar equipment. Hinges (top, bottom or side) can be used with the panels to provide increased convenience for opening and closing off the outer wall in this manner.

Upper Portion of the Outer Wall. The optional upper portion of the outer wall 5 may contain alternating arrays of lights 8 and fans 9 to illuminate and help improve environmental conditions in the work area. Both can be run from the onboard power options 16 (generator or semi-tractor power take-off), as will the power strip along the lower portion of wall 11. The fans, for example, can be enclosed with protective screening. Optional heating and cooling units (air-conditioning or misters) can be added to the fans to provide a bit cooler air when it is hot and a bit warmer air when it is cool. Both heating and cooling units can be carried at one or both ends of the trailer and powered from the onboard sources 16.

The very top of the wall (above the lights and fans) can carry optional overhead protection in the form of extendable mesh 35 or tarp canopies 40 (FIG. 6). Offset retractable arms 10 at each end of the trailer can be extended out over portions of the work area to roll out and provide mesh protection from the sun or tarp protection from rain, snow and other inclement weather. Optional mid-trailer braces can be used to support and strengthen the retractable beams once deployed. It is anticipated that the canopy would not be deployed much of the time, as mobility, convenience, problematic winds, vehicular traffic inside the work area and other factors may make such additional protection impractical.

The mid and upper walls are optional and the trailer can be used without the as shown in FIG. 2. While research indicates that the mid and upper portions provide important safety enhancements, they may be deemed unnecessary where, for example, the trailer is used exclusively for day construction.

Users in such cases may prefer only the base trailer with a fixed lower wall, caboose, safety lighting and crash attenuation, as shown in FIG. 2. Where the mid and upper walls are not deployed, a short riser of solid or flexible material may be used to raise the visual barrier such as to a level of about 5 feet and/or consistent with the height of the platforms. Higher visual barriers can be provided.

Additional hitch options can also be employed. The preferred hitch embodiment is the standard semi tractor trailer connection as disclosed above, but other hitch options can be incorporated including without limitation fifth wheel designs and special hitch configurations for construction and other heavy equipment such as graders, plows and other trucks which might otherwise be available for service.

Additional caboose options can also be employed. The preferred caboose embodiment is as discussed above, but a permanently affixed caboose and/or rear axle can be used if and to the extent the user so desires. In such cases, the user would not be able to switch the ends to which the tractor attaches, and thus would not be able to change the side to which the work area opens, but the user may have more than one trailer dedicated for different applications and not require such flexibility.

The trailer is designed to be heavy enough to withstand a front or rear impact, a glancing blow or more direct side impact, and yet provide reasonable protection for the work area inside. In that regard, the low center of weight is intended to provide a relatively immobile fortress. The wall itself, as well as the caboose, is intentionally meant to be expendable and replaceable in the event of an incident. Steel panels can be easily inspected, removed and replaced. Sections can be cut and re-welded. Interior wall bracing refortified. Sand can be refilled and fabricated sections can be replaced.

The trailer was designed to provide a physical barrier, improve lighting and ventilation, reduce the number of construction vehicles and equipment needed inside the work area, and to reduce the ability of passing traffic to see or err into the work area, all factors studies indicate are important for increasing the safety of the work crews and the public at large. The trailer design intentionally and importantly strives to provide these safety enhancements in a convenient package while keeping overall design simple and relatively economical to manufacture, maintain and repair.

While specifically conceived and developed for road construction and maintenance crews following the tragic death of two employees of the Colorado Department of Transportation, the trailer can be used for other purposes as well. No limitation is place on the purposes for which it is deployed.

The outfitting of the trailer can be modified. For example, the trailer can be used with or without the mid and upper walls; different crash attenuators can be attached to and used with the caboose; hydraulics, compressors, and generators can be separately provided or replaced by the user; the overhead canopy protection can be omitted; duplicate directional lighting on the trailer and the caboose can be consolidated if deemed unnecessary. These and other changes can be made, but fundamentally, the present invention offers a new level of physical protection and safety, day and night.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:
1. A safety trailer assembly, comprising:
(a) first and second platforms, the first platform comprising a hitch member to removably attach to a motorized vehicle and the first and second platforms defining a longitudinal center line passing through the first and second platforms;
(b) a rigid wall defined by at least a first side of each of the first and second platforms, the rigid wall enclosing a work area and being configured to withstand an impact from motorized traffic;
wherein:
a side of the enclosed work area is open to enable vehicular and personnel access to the enclosed work area and to permit personnel to access a road surface underlying the enclosed work area;
the rigid wall further comprises at least one panel extending between and attached to the first and second platforms, and
the at least one panel attaches to the first and second platforms at a distance from the longitudinal center line.

2. The assembly of claim 1, wherein the at least one panel is fixed relative to the first and second platforms and the at least one panel does not shift or articulate relative to the first and second platforms.

3. The assembly of claim 1, further comprising a plurality of:
a crash attenuator;
on-board hydraulics;
a compressor;
a power generator and power hookups for equipment;
a portable restroom facility;
a heating and cooling system; and
a ventilation system.

4. The assembly of claim 1, further comprising a crash attenuator on an end of the assembly opposite the motorized vehicle hitch member and onboard directional lighting to illuminate the work area.

5. The assembly of claim 1, further comprising first and second hitch members, respectively, at the first and second platforms and a wheeled caboose configured to removably engage the first and second hitch members, wherein, in a first mode, the motorized vehicle is attached to the first hitch member and caboose to the second hitch member and, in a second mode, the motorized vehicle is attached to the second hitch member and a caboose to the first hitch member, whereby the right wall can open to the first or second side of a road.

6. The assembly of claim 1, further comprising a counterbalancing weight to counterbalance a weight of the rigid wall.

7. The assembly of claim 1, further comprising a caboose removably attached to the second platform, the caboose comprising at least one axle, wheels, brakes, a crash attenuation unit, and wherein the caboose is fixed in place to function like the rear wheels of a standard semi-trailer.

8. The assembly of claim 7, wherein the caboose comprises a hitch connection operable to engage a hitch engaging member of the motorized vehicle to reposition the caboose when disengaged from the second platform.

9. The assembly of claim 1, wherein the at least a first and second sides of the first and second platforms comprises additional wall sections positioned between the first and second platforms and wherein the first side is substantially planar to direct a motorized vehicle impacting the first side away from the work area.

10. The assembly of claim 1, wherein the at least one wall panel comprises a heavily constructed rigid lower portion to provide a barrier to traffic, and is engaged with an upper portion to provide a visual barrier to motorists and wherein the lower portion extends from at or near ground level to a height at least as high as a hood of a car, pickup or sports utility vehicle.

11. The assembly of claim 1, wherein the at least one panel does not rotate relative to the first and second platforms.

12. A method comprising:
   (a) providing a deployed safety trailer, the safety trailer comprising first and second platforms and at least one panel extending between and attached to the first and second platforms, wherein the first and second platforms and the at least one panel define a rigid wall; the rigid wall enclosing a protected work area and being configured to withstand an impact from motorized traffic;
   (b) detaching the at least one panel from the first and second platforms;
   (c) engaging the first and second platforms with each other;
   (d) locating the at least one panel on top of the first and second platforms to form an undeployed safety trailer; and
   (e) engaging a motorized vehicle with a hitch member of one of the first and second platforms.

13. The method of claim 12, further comprising:
   (f) relocating, by the motorized vehicle, the undeployed safety trailer to a different location;
   (g) removing at least first and second panels of the rigid wall from at least one of the first and second platforms;
   (h) disengaging the first and second platforms from each other;
   (i) attaching the at least one panel to the first platform;
   (j) attaching the at least one panel to the second platform to form a deployed safety trailer; and
   (k) stabilizing the deployed safety trailer to withstand a vehicular impact on the rigid wall.

14. The method of claim 12, wherein, when supported by the first and second platforms, the at least one panel is not in direct physical contact with a stand positioned on a surface supporting the deployed safety trailer.

15. A safety trailer assembly, comprising:
   (a) first and second platforms, the first platform comprising a hitch member to removably attach to a motorized vehicle and the second platform having wheels and an axle;
   (b) a rigid wall defined by at least a first side of each of the first and second platforms, the rigid wall enclosing a work area and being configured to withstand an impact from motorized traffic;
   wherein:
     a side of the enclosed work area is open to enable vehicular and personnel access to the enclosed work area and to permit personnel to access a road surface underlying the enclosed work area; and
     a rigid plate covers a first wheel on the first side to inhibit contact of impacting motorized traffic with the first wheel.

16. The assembly of claim 15, wherein the rigid wall further comprises at least one panel extending between and attached to the first and second platforms, and
   wherein the at least one panel is fixed relative to the first and second platforms and the at least one panel does not shift or articulate relative to the first and second platforms.

17. The assembly of claim 15, further comprising a plurality of:
   a crash attenuator;
   on-board hydraulics;
   a compressor;
   a power generator and power hookups for equipment;
   a portable restroom facility;
   a heating and cooling system; and
   a ventilation system.

18. The assembly of claim 17, further comprising first and second hitch members, respectively, at the first and second platforms and a wheeled caboose configured to removably engage the first and second hitch members, wherein, in a first mode, the motorized vehicle is attached to the first hitch member and caboose to the second hitch member and, in a second mode, the motorized vehicle is attached to the second hitch member and a caboose to the first hitch member, whereby the right wall can open to the first or second side of a road.

19. The assembly of claim 15, further comprising a crash attenuator on an end of the assembly opposite the motorized vehicle hitch member and onboard directional lighting to illuminate the work area.

20. The assembly of claim 15, further comprising a counterbalancing weight to counterbalance a weight of the rigid wall.

21. The assembly of claim 15, further comprising a caboose removably attached to the second platform, the caboose comprising the axle, the wheels, brakes, a crash attenuation unit, and wherein the caboose is fixed in place to function like the rear wheels of a standard semi-trailer.

22. The assembly of claim 21, wherein the caboose comprises a hitch connection operable to engage a hitch engaging member of the motorized vehicle to reposition the caboose when disengaged from the second platform.

23. The assembly of claim 15, wherein the at least a first and second sides of the first and second platforms comprises additional wall sections positioned between the first and second platforms and wherein the first side is substantially planar to direct a motorized vehicle impacting the first side away from the work area.

24. The assembly of claim 15, wherein the at least one wall panel comprises a heavily constructed rigid lower portion to provide a barrier to traffic, and is engaged with an upper portion to provide a visual barrier to motorists and wherein the lower portion extends from at or near ground level to a height at least as high as a hood of a car, pickup or sports utility vehicle.

25. The assembly of claim 15, wherein the rigid wall further comprises at least one panel extending between and attached to the first and second platforms and wherein the at least one panel does not rotate relative to the first and second platforms.

26. A safety trailer assembly, comprising:
   (a) first and second platforms, the first platform comprising a hitch member to removably attach to a motorized vehicle;
   (b) a rigid wall defined by at least a first side of each of the first and second platforms, the rigid wall enclosing a work area and being configured to withstand an impact from motorized traffic;
   wherein:
     a side of the enclosed work area is open to enable vehicular and personnel access to the enclosed work area and to permit personnel to access a road surface underlying the enclosed work area; and the rigid wall further comprises at least one panel extending between and attached to the first and second platforms, wherein the at least one panel is fixed relative to the first and second platforms and the at least one panel does not shift or articulate relative to the first and second platforms.

27. The assembly of claim 26, wherein the at least one panel does not rotate relative to the first and second platforms.

28. The assembly of claim 26, further comprising a plurality of:
- a crash attenuator;
- on-board hydraulics;
- a compressor;
- a power generator and power hookups for equipment;
- a portable restroom facility;
- a heating and cooling system; and
- a ventilation system.

29. The assembly of claim 26, further comprising a crash attenuator on an end of the assembly opposite the motorized vehicle hitch member and onboard directional lighting to illuminate the work area.

30. The assembly of claim 26, further comprising first and second hitch members, respectively, at the first and second platforms and a wheeled caboose configured to removably engage the first and second hitch members, wherein, in a first mode, the motorized vehicle is attached to the first hitch member and caboose to the second hitch member and, in a second mode, the motorized vehicle is attached to the second hitch member and a caboose to the first hitch member, whereby the right wall can open to the first or second side of a road.

31. The assembly of claim 26, further comprising a counterbalancing weight to counterbalance a weight of the rigid wall.

32. The assembly of claim 26, further comprising a caboose removably attached to the second platform, the caboose comprising at least one axle, wheels, brakes, a crash attenuation unit, and wherein the caboose is fixed in place to function like the rear wheels of a standard semi-trailer.

33. The assembly of claim 32, wherein the caboose comprises a hitch connection operable to engage a hitch engaging member of the motorized vehicle to reposition the caboose when disengaged from the second platform.

34. The assembly of claim 26, wherein the at least a first and second sides of the first and second platforms comprises additional wall sections positioned between the first and second platforms and wherein the first side is substantially planar to direct a motorized vehicle impacting the first side away from the work area.

35. The assembly of claim 26, wherein the at least one wall panel comprises a heavily constructed rigid lower portion to provide a barrier to traffic, and is engaged with an upper portion to provide a visual barrier to motorists and wherein the lower portion extends from at or near ground level to a height at least as high as a hood of a car, pickup or sports utility vehicle.

* * * * *